May 1, 1962 W. W. BELL 3,032,764
RECORDING APPARATUS
Filed July 22, 1958 3 Sheets-Sheet 2
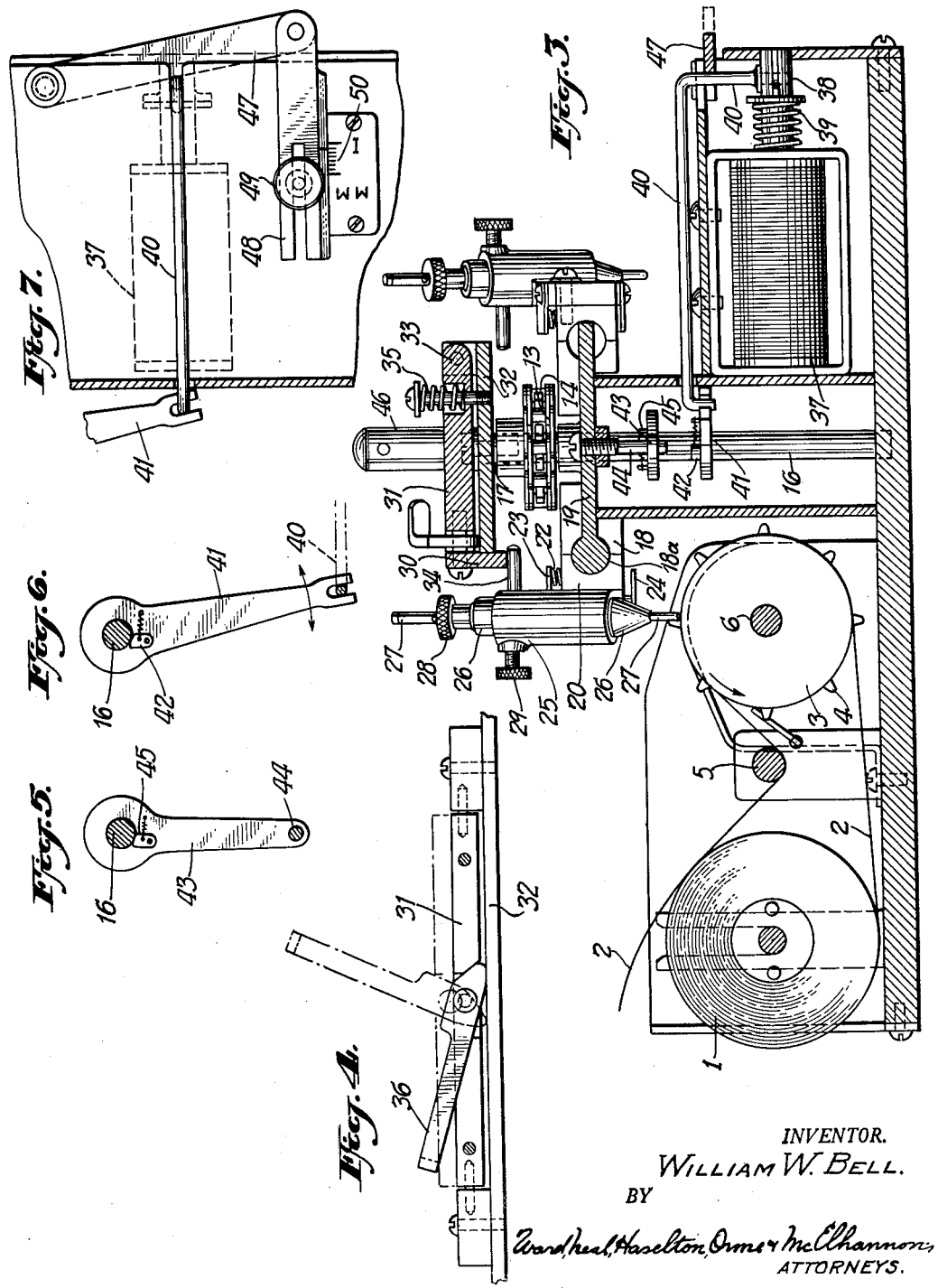
INVENTOR.
WILLIAM W. BELL
BY
Ward, Neal, Haselton, Orme & McElhannon,
ATTORNEYS.

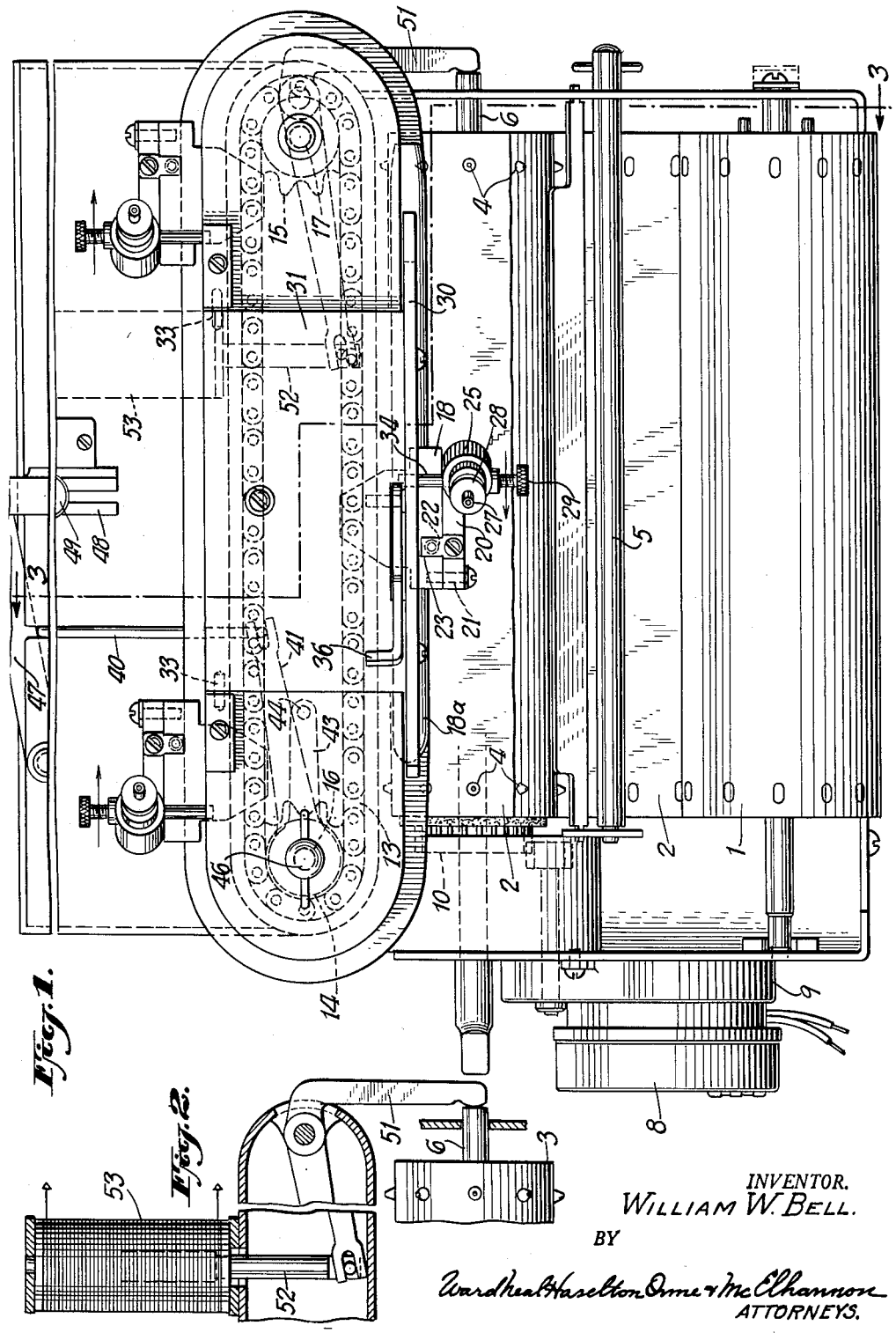

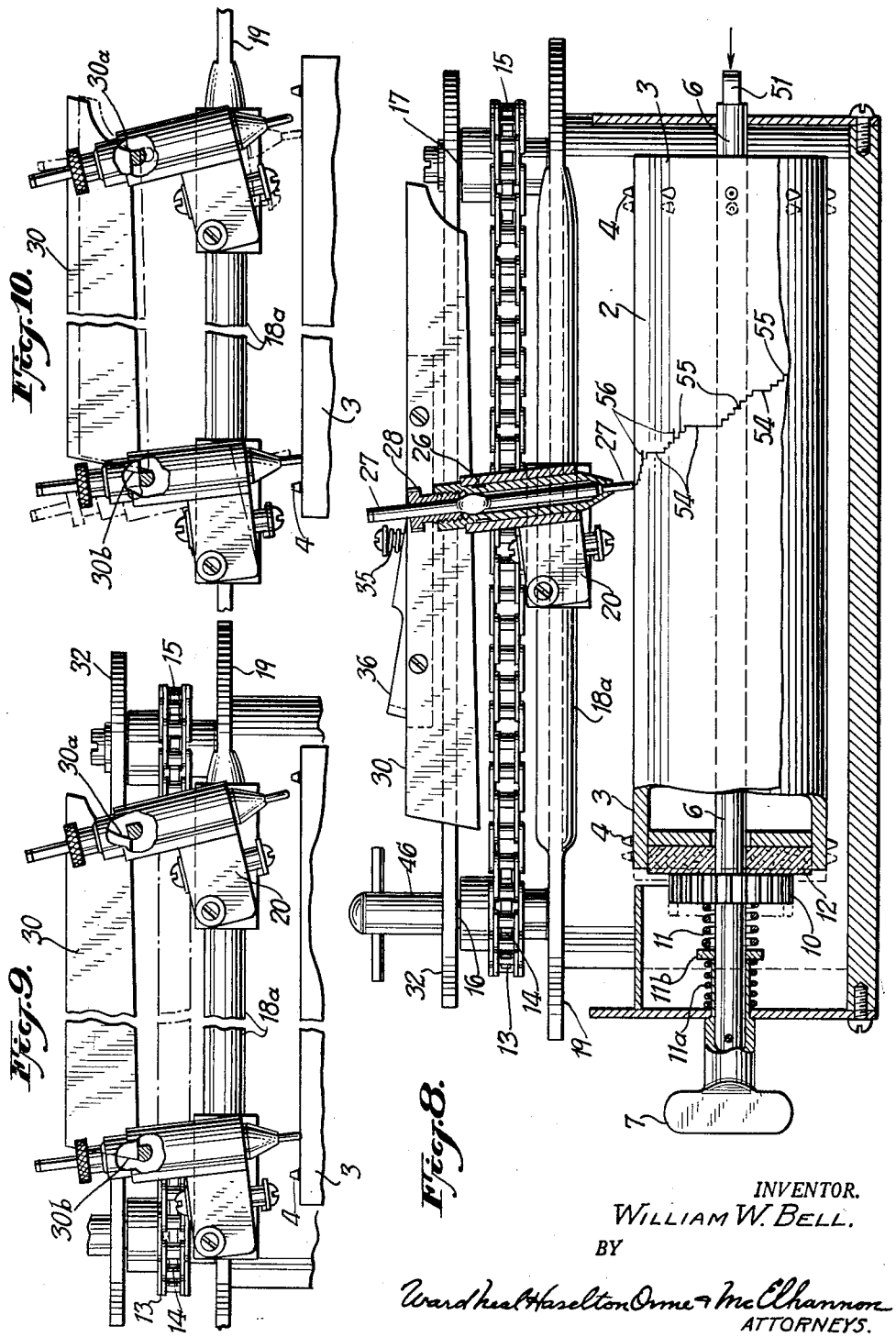

United States Patent Office 3,032,764
Patented May 1, 1962

3,032,764
RECORDING APPARATUS
William W. Bell, 201 Serpentine Road, Tenafly, N.J.;
Harriet H. Bell, executrix of said William W. Bell,
deceased
Filed July 22, 1958, Ser. No. 750,238
9 Claims. (Cl. 346—62)

In studying animal behavior under the influence of different drugs or other attendant factors affecting the animal, animals such as white rats are frequently placed in a cage containing a treadle or the like which the animal may readily actuate, and a dispensing mechanism is provided which discharges into the cage an appropriate "reward"—for example an edible pellet, whenever the animal actuates the treadle in compliance with preset operating conditions. For example the "reward" dispensing mechanism may be arranged to operate after the animal has actuated the treadle a predetermined number of times, or when after obtaining the reward, the animal again actuates the treadle when a prescribed period of time has elapsed.

The present invention relates to recording apparatus by which the behavior of the animal as indicated by the number of times the treadle is actuated and the number of times a "reward" is obtained as time passes, will be automatically indicated by a graph recorded upon a traveling record sheet. In accordance with the invention in one of its aspects, the record sheet feeding mechanism feeds the sheet forwardly at a definite rate, and an endless stylus carrier is employed which travels in a path directed transversely of the record sheet, and carries a plurality of stylus devices which are spaced along the carrier and so coordinated that the several stylus devices travel successively across the record sheet in contact therewith, to produce a succession of graphs on the sheet as the latter continues to travel forwardly. The stylus carrier moves transversely across the record sheet in step by step fashion, each step of transverse travel occurring when the above mentioned treadle is actuated. As thus far described, the graph will be in the form of a line directed longitudinally of the sheet so long as the treadle is not actuated, and each actuation of the treadle will shift the stylus carrier transversely of the sheet to produce a jog in the recorded line. Thus the graph will show the number of treadle actuations occurring in any given time and the times at which they occur. Usually the stylus devices will be so coordinated that when one of them has nearly completed its transverse travel across the record sheet in contact therewith, that particular stylus is removed from contact with the sheet, and simultaneously the next succeeding stylus will be brought into contact with the sheet near its opposite side edge, to be drawn progressively across the sheet as further actuations of the treadle occur. Thus the record will consist of successive graphs extending in general diagonally across the record sheet, and each successive stylus will continue the record so to speak from the point where the immediately preceding stylus was disengaged from the sheet.

The relative motion between the stylus and the record sheet is further modified whenever a reward producing actuation of the treadle occurs, so that the number of such events and the times of occurrence will also be apparent from the graphs. This may be accomplished for example by temporarily shifting the sheet feeding mechanism transversely of the direction of sheet feed whenever a reward producing actuation of the treadle occurs, so as to produce an abnormal shape of the graph at that point. If the record sheet be thus temporarily shifted transversely in a direction opposite to the direction of movement of the stylus carrier and then restored to its transverse position as determined by the carrier feed mechanism, a somewhat zigzag pattern will be produced in the graph at that point. The graph will then show both the number of times the treadle has been actuated, the number of times the reward dispensing mechanism has been activated, and the times at which each of such events occurred.

In one of its more specific aspects the invention aims to promote the satisfactory use of a pen of the ball point type as a stylus, by providing a priming operation at the time when the pen comes into engagement with the record sheet. Pencils and other forms of marking device may also be used. Also the recording apparatus is preferably so arranged that the extent to which the recording stylus travels during each step of its above mentioned step by step movement, may be readily and accurately altered to produce graphs of varying steepness. Further objects and advantages of the invention will be in part obvious and in part specifically referred to in the description hereinafter contained which, taken in conjunction with the accompanying drawings, discloses a preferred form of apparatus constructed to operate in accordance with the invention; the disclosure however should be considered as merely illustrative of the invention in its broader aspects. In the drawings—

FIG. 1 is a general plan view of the preferred form of apparatus embodying the invention.

FIG. 2 is a fragmentary detail section showing particularly the mechanism used to shift the record sheet transversely in response to reward producing actuations of the treadle, as above referred to.

FIG. 3 is a vertical longitudinal section taken through the apparatus shown in FIG. 1.

FIGS. 4–7 are fragmentary detail views of various elements entering into the apparatus.

FIG. 8 is a front elevation of the apparatus, partly in section.

FIGS. 9 and 10 are fragmentary front elevations showing respectively the positions assumed by successive stylus devices prior to, and immediately after the phase when the forward stylus is disengaged from the record sheet, and the next following stylus is engaged therewith.

The disclosed form of record sheet feeding mechanism includes an idler supply roll 1 preferably provided with an appropriate friction drag (not shown) and from which the record sheet 2 passes to a positively driven feed roll 3 having teeth 4 near its opposite ends which engage in mating perforations in the record sheet to feed the latter forwardly at a predetermined rate. The graph is recorded on the sheet as it passes over the feed roll 3, from whence the sheet passes under a guide bar 5 (FIG. 3) and over the supply roll 1 to the point of delivery.

As shown the feed roll 3 is carried by a spindle 6 mounted in the frame of the machine and having a knob 7 (FIG. 8) at one end by which the feed roll 3 may be manually turned in either direction. An electric motor 8 (FIG. 1) which preferably is of a type which may be adjusted to different speeds, may be understood as driving the spindle 6 through appropriate reduction gearing contained in a housing 9 (FIG. 1), this gearing connecting to a gear 10 (FIG. 8) which is loose on the spindle 6 but pressed by spring 11 against pad 12 on the corresponding end of feed roll 3 so that normally gear 10 turns roll 3 at a fixed rate, but permitting the roll to be turned in either direction by manipulation of knob 7 when desired.

The illustrated form of stylus carrier mechanism involves primarily a chain 13 running transversely of the path of travel of the record sheet, and engaging the sprocket wheels 14 and 15 (FIG. 1), the sprocket wheels being carried respectively by the vertical spindles 16 and 17. The stylus devices above referred to are mounted in spaced relation along the chain 13, and thus if the chain 13 be driven in step by step fashion, the stylus devices will be successively moved transversely across the record sheet 2 as the latter is fed forwardly at a fixed rate by roll 3.

The several stylus devices may be constructed alike, and therefore a description of one will serve for all. The primary support for the stylus may be in the form of a block 18 (FIG. 3) of U-shaped section which is attached to one of the links of the chain 13 and which is guided in its travel by the rim of a fixed plate 19 (FIG. 3) which underlies the chain 13 and is appropriately mounted in the frame of the machine. At the rearward inactive pass of the chain the engagement between the block 18 and the plate 19 may be loose, but at the active pass of the chain where the stylus in in engagement with the record sheet, the rim of plate 19 is preferably enlarged as indicated at 18a (FIG. 3) to determine the vertical position of block 18 more precisely and promote the maintenance of accurate and proper engagement between the stylus and the record sheet.

An auxiliary stylus supporting arm 20 (FIG. 1) is pivotally connected to the block 18 as indicated at 21 to support the stylus, and a spring 22 (FIG. 3) engaging under a lug 23 on arm 20 urges the latter toward an upper position in which the stylus is held out of contact with the record sheet. A stop 24 (FIG. 3) limits the extent of this upward movement.

The arm 20 is provided with a hub 25 which slidably receives a barrel 26 within which the ball point pen type stylus 27 is clamped by a screw 28. The vertical position of the barrel 26 with respect to the hub 25 may be adjusted and set by screw 29 (FIG. 3) to the end that when the arm 20 swings down (as hereinafter described) against the pressure of spring 22 to a lower position, the ball point of the stylus will be precisely positioned in proper relation to the record sheet to produce the graph above referred to.

Throughout the rearward inactive pass of the chain 13 the springs 22 will hold the stylus devices in upper position, but at the beginning of the active pass of chain 13 where a stylus assumes a position immediately above one edge portion of the record sheet, a pressure bar 30 comes into play which will depress the stylus supporting arm 20 to bring the point of the stylus 27 into recording engagement with the corresponding side edge portion of the record sheet 2. In the illustrated embodiment of the invention this pressure bar takes the form of a vertical plate mounted upon an arm 31 (FIG. 3) which is pivoted to a frame member 32 of the machine as indicated at 33 (FIG. 3). A pin 34 on the hub 25 moves into engagement with the edge of the pressure bar 30 as the corresponding stylus approaches active position. As shown in FIGS. 9 and 10 the entering edge so to speak of pressure bar 30 is preferably steeply inclined as indicated at 30a (FIG. 9 and 10) so that as the stylus advances toward active position, the edge 30a swings the arm 20 rapidly down to bring the ball of the stylus into a position directly above the record sheet, whereupon the stylus is brought into contact with the record sheet with a light percussion blow as later more fully described. This impact primes the ball point pen unit with ink to the end that the recording of the graph will begin instantly when the stylus comes into contact with the sheet.

As the stylus travels across the recording sheet it will be held in proper engagement therewith by pressure bar 30, and preferably at the instant the next succeeding stylus comes into alinement with one side edge portion of the sheet as above described, the stylus which has traveled across the sheet will reach the far edge 30b of the pressure bar, whereupon the spring 22 of the stylus which has completed its work, will swing the latter out of engagement with the sheet simultaneously with the engagement of the next succeeding stylus therewith.

Preferably the pressure bar 30 is so arranged that when desired it may be manually retracted from the normal position in which it holds the stylus against the record sheet. As shown in FIG. 3 a spring 35 urges the pressure bar 30 toward its normal operating position above described, but a lever 36 may be swung up to the position indicated in dotted lines in FIG. 4, in which position pressure bar 30 will have been moved upwardly to relieve the active stylus from engagement with the record sheet, spring 22 then cauisng arm 20 to swing upwardly for the above purpose. Restoration of the lever 36 to the position shown at the left of FIG. 4 will restore the stylus to sheet engaging position. From FIG. 8 it will be noted that the lower edge of pressure bar 30 is inclined downwardly toward the end of the bar which appears at the left of FIG. 8, where the stylus which has traveled across the record sheet is moved out of contact with the sheet. As the active stylus travels across the sheet, the spring 35 (FIG. 3) urges the stylus continuously into engagement with the sheet, and the above mentioned inclined lower edge of the pressure bar causes the latter to tilt progressively upward about the pivot 33 and against the action of the spring 35, as the active stylus moves progressively across the sheet. By the time the active stylus has moved free of the left hand end of pressure bar 30 (as the latter appears in FIG. 8) the incoming stylus, so to speak, which is next to come into engagement with the record sheet, will have moved to a position underneath the right hand portion of the lower edge of the pressure bar (as the latter appears in FIG. 8) but the pin 34 of the incoming stylus will be spaced below the corresponding end of the pressure bar, due to the lifting of the latter by the outgoing stylus as above referred to. Then as soon as the outgoing stylus passes beyond the pressure bar, the spring 35 will depress the latter to bring the incoming stylus into contact with the record sheet with a percussion blow as previously mentioned.

In the illustrated form of the invention the transverse step by step movement of the stylus devices is secured by energizing solenoid 37 (FIG. 3) which should be understood as included in an appropriate electrical circuit which is closed whenever the treadle previously referrred to is depressed by the animal. As shown the armature 38 (FIG. 3) of this solenoid is normally held by spring 39 in partially withdrawn position with respect to the solenoid. Whenever circuit to solenoid 37 is closed the armature 38 moves to the left as the parts appear in FIG. 3, and a link 40 (FIG. 3) connected to the armature rocks a one-way clutch device 41 to turn the driving shaft 16 of the stylus carrier feeding mechanism through an angle depending upon the extent of motion of the link 40. This one-way clutch device 41 as shown schematically in FIG. 6, may comprise a rocker arm loose upon the spindle 16 and provided with an appropriate pivoted dog 42 which causes the spindle 16 to turn in the stylus feeding direction whenever solenoid 37 is energized. During the return movement of the link 40 as produced by spring 39 after solenoid 37 has been de-energized, the clutch 41 turns reversely without turning the spindle 16, the spindle 16 being preferably held against turning in the reverse direction by a similar one-way clutch device 43 (FIGS. 3 and 5) which is held against angular movement by a fixed post 44 and as schematically shown in FIG. 5 is provided with an appropriate dog 45 which permits angular movement of spindle 16 in the direction of feed, but locks the spindle 16 against angular movement in the reverse direction.

The stylus carrier mechanism may be manually adjusted in the direction of feed whenever desired, by twisting the hand grasp member 46 on the upper end of the spindle 16.

In a recording apparatus of the type under discussion, it is advantageous to enable the extent to which the stylus devices travel during each step of their above described transverse step by step movement, to be readily and accurately altered. For this purpose the disclosed form of apparatus includes a pivoted lever 47 (FIGS. 3 and 7) against which the link 40 is pressed by spring 39 when solenoid 37 is de-energized. By means of the slotted link 48 (FIG. 7) and set screw 49 the position of this lever 47 may be altered and set to graduations on the scale 50 (FIG. 7). In this way the extent of transverse stylus feed per step may be precisely regulated, for example anywhere between 0 and 1.5 mm., a range which will be sufficient for most purposes.

In the illustrated embodiment of the invention the reward producing actuations of the treadle are indicated on the graphs by temporarily shifting the record sheet feeding roll 3 and the record sheet carried thereby in a transverse direction opposite to the direction of feed of the stylus devices 27, whenever a reward producing actuation of the treadle occurs. The spring 11a pressing against a fixed collar 11b on spindle 6 (FIG. 8) normally urges the sheet feeding roll 3 and the sheet 2 toward the right as the parts appear in FIG. 8. But a pivoted lever 51 (FIG. 2) bears against the adjacent end of the spindle 6 which supports roller 3, the position of this lever being controlled by the armature 52 (FIG. 2) of a solenoid 53. This solenoid should be understood as included in a circuit which is closed temporarily whenever a reward producing actuation of the treadle occurs, whereupon armature 52 will be drawn further into the solenoid 53 and lever 51 will be rocked against the pressure of spring 11a to temporarily shift the sheet feed roller 3 and the record sheet carried thereby, to the left as the parts appear in FIG. 8. As soon as the circuit to the solenoid 53 is opened spring 11a will shift the parts back to the position shown in FIG. 8.

Accordingly, the record sheet being continuously fed forwardly at a fixed rate as above described, so long as there are no actuations of the treadle, the curve produced on the record sheet will be as indicated by the vertical portions 54 (FIG. 8). Whenever treadle actuations occur the curve will be as indicated by the stepped portions 55 (FIG. 8) and whenever a reward producing actuation of the treadle occurs, the graph will be modified as indicated at 56 in FIG. 8.

Although the invention has been disclosed as carried out by apparatus of the above described specific form, it should be understood that alterations may be made therein without departing from the invention in its broader aspects, within the scope of the appended claims.

I claim:

1. Recording apparatus of the character described including sheet feeding mechanism constructed to feed a record sheet progressively forward, an endless stylus carrier mechanism, means mounting said carrier mechanism for movement through a path transverse to the direction of feed of said sheet feeding mechanism, a stylus device of the ball point pen type carried by said carrier mechanism, means mounting said device upon said carrier mechanism to afford movement of said device in a direction toward and from the path of travel of the record sheet, and means for moving said stylus into sheet contacting position, said last mentioned means operable responsive to said movement of the carrier mechanism, and said means being constructed to impart a hammer-like blow to the stylus as it engages the sheet, to thereby prime the ball of said stylus.

2. Recording apparatus of the character described including sheet feeding mechanism constructed to feed a record sheet progressively forward, an endless stylus carrier mechanism, means mounting said mechanism for movement through a path transverse to the direction of feed of said sheet feeding mechanism, a plurality of stylus devices, means mounting said devices upon said carrier mechanism in spaced relation therealong, and intermittently operating means for actuating said stylus carrier mechanism in step by step manner to cause said stylus devices to travel successively across the path of travel of the record sheet as the latter is fed forwardly by said sheet feeding mechanism, and intermittently operating means selectively operable to temporarily shift said sheet feeding mechanism transversely of its normal direction of feed, to thereby modify the relative transverse movements between said mechanisms as produced by said means for actuating the stylus carrier mechanism.

3. Recording apparatus of the character described including sheet feeding mechanism constructed to feed a record sheet progressively forward, means mounting said feed mechanism for movement transverse to the forward movement of the sheet, an endless stylus carrier mechanism, means mounting said carrier mechanism for movement through a path transverse to the direction of feed of said feeding mechanism, a plurality of stylus devices, means mounting said devices upon said carrier mechanism in spaced relation therealong, a first solenoid, means responsive to successive activations of said first solenoid for actuating said stylus carrier mechanism to cause said stylus devices to travel successively in step by step manner across the path of travel of the record sheet as the latter is fed forwardly by said sheet feeding mechanism, a second solenoid, and means responsive to activation of said second solenoid for moving said sheet feeding mechanism transversely of the path of travel of the record sheet.

4. Recording apparatus of the character described including sheet feeding mechanism constructed to feed a record sheet progressively forward, means mounting said feeding mechanism to afford movement thereof transverse to the forward movement of the sheet, spring means urging said feeding mechanism to one limit of such transverse movement, an endless stylus carrier mechanism, means mounting said carrier mechanism for movement through a path transverse to the direction of feed of said sheet feeding mechanism, a plurality of stylus devices, means mounting said devices upon said carrier mechanism in spaced relation therealong, a first solenoid, means responsive to successive activations of said first solenoid for actuating said stylus carrier mechanism to cause said stylus devices to travel successively in step by step manner across the path of travel of the record sheet as the latter is fed forwardly by said sheet feeding mechanism, a second solenoid, and means responsive to activation of said second solenoid for moving said sheet feeding mechanism transversely of the path of travel of the record sheet in opposition to said spring means.

5. Recording apparatus of the character described including sheet feeding mechanism constructed to feed a record sheet progressively forward, an endless stylus carrier mechanism, means mounting said mechanism for movement through a path transverse to the direction of feed of said sheet feeding mechanism, a plurality of stylus devices, means mounting said devices upon said carrier mechanism in spaced relation therealong, a pressure bar member disposed adjacent the path of travel of said stylus devices when moving across the path of travel of the record sheet, means mounting said pressure bar member to move the same toward and from said stylus devices when so moving, means urging said pressure bar member into position to press said stylus device into contact with the record sheet when said devices are so moving, and means whereby simultaneously upon removal of one said stylus device from contact with said record sheet said pressure bar member successively presses another of the so moving stylus devices into engagement with the record sheet by imparting a hammer-like blow to such other stylus.

6. Recording apparatus of the character described including sheet feeding mechanism constructed to feed a record sheet progressively forward, an endless stylus carrier mechanism, means mounting said carrier mechanism for movement through a path transverse to the direction of feed of said sheet feeding mechanism, a plurality of stylus devices of the ball point pen type, means mounting said devices upon said carrier mechanism in spaced relation therealong and affording movement of said stylus devices toward and from the path of travel of the record sheet, means for actuating said stylus carrier mechanism to cause said stylus devices to travel successively across the path of travel of the record sheet as the latter is fed forwardly by said sheet feeding mechanism, a pressure bar member disposed adjacent the path of travel of said stylus devices when moving successively across the record sheet, means mounting said pressure bar member for movement toward and from said stylus devices when so moving, means urging said pressure bar member into position to press said stylus devices into contact with the record sheet when said devices are so moving, said pressure bar member including means whereby a stylus device which has moved substantially across the record sheet moves the pressure bar member out of position to engage the next succeeding stylus device which is to move transversely across the record sheet, and then subsequently releases said pressure bar member to move the last mentioned stylus device with a hammer-like blow into contact with the record sheet simultaneously with the removal of the first said stylus from contact with the record sheet.

7. Recording apparatus of the character described including sheet feeding mechanism constructed to feed a record sheet progressively forward, an endless stylus carrier mechanism, means mounting said mechanism for movement through a path transverse to the direction of feed of said sheet feeding mechanism, a plurality of stylus devices, means mounting said stylus devices upon said carrier mechanism in spaced relation therealong, means urging said sheet feeding mechanism toward one position transversely of the forward path of travel of the record sheet, and means acting in opposition to said last mentioned means for temporarily shifting the transverse position of said sheet feeding mechanism.

8. In recording apparatus of the character described including a record sheet, an endless stylus carrier mechanism mounted for movement across said sheet, and a stylus mounted on said carrier mechanism for engaging said sheet, means for accurately guiding said stylus along its path of traverse across said sheet comprising a substantially U-shaped stylus support block connected for movement by said carrier mechanism, said block having an enlarged aperture configured guide surface between the interior surfaces of the leg portions of said U-shape, the interior surfaces of said leg portions at the free ends thereof also forming guide surfaces, and a fixed plate having an edge surface extending parallel to said stylus path within the length of said carrier mechanism, said edge surface of the fixed plate having enlarged sectional configuration corresponding to that of said aperture configured guide surface of the support block in close slidable engagement therewith when said stylus is engaging said sheet, said interior surfaces of the leg portions of said U-shaped support block also in close slidable engagement with said fixed plate when said stylus is engaging said sheet.

9. In recording apparatus of the character described including a record sheet, an endless stylus carrier mechanism mounted for movement across said sheet, and a stylus mounted on said carrier mechanism for engaging said sheet, means for accurately guiding said stylus along its path of traverse across said sheet comprising a substantially U-shaped stylus support block connected for movement by said carrier mechanism, said block having an enlarged aperture configured guide surface between the interior surfaces of the leg portions of said U-shape, the interior surfaces of said leg portions at the free ends thereof also forming guide surfaces, a fixed plate having an edge surface extending parallel to said stylus path within the length of said carrier mechanism, said edge surface of the fixed plate having enlarged sectional configuration corresponding to that of said aperture configured guide surface of the support block in close slidable engagement therewith when said stylus is engaging said sheet, said interior surface of the leg portions of said U-shaped support block also in close slidable engagement with said fixed plate when said stylus is engaging said sheet, a pressure bar member disposed adjacent said stylus path and having a guide surface for urging said stylus into engagement with said sheet, and additional guide surface means of said stylus engaging said pressure bar guide surface when said stylus is engaging said sheet.

References Cited in the file of this patent
UNITED STATES PATENTS

| | | |
|---|---|---|
| 1,155,679 | Phelps | Oct. 5, 1915 |
| 1,184,277 | Tran et al. | May 23, 1916 |
| 1,431,597 | Poppelreuter | Oct. 10, 1922 |
| 2,141,974 | Finch | Dec. 27, 1938 |
| 2,387,563 | Chapple | Oct. 23, 1945 |
| 2,431,125 | Klaus | Nov. 18, 1947 |
| 2,614,900 | Clarke et al. | Oct. 21, 1952 |
| 2,749,205 | Schmitt | June 5, 1956 |
| 2,891,107 | Weingart et al. | June 16, 1959 |
| 2,892,666 | Parker et al. | June 30, 1959 |
| 2,926,984 | Gerbrands | Mar. 1, 1960 |

FOREIGN PATENTS

| | | |
|---|---|---|
| 250,307 | Italy | Sept. 27, 1926 |
| 628,979 | Great Britain | Sept. 8, 1949 |